(12) United States Patent
Liu et al.

(10) Patent No.: US 8,620,496 B2
(45) Date of Patent: Dec. 31, 2013

(54) SYSTEMS AND METHOD OF CONTROLLING A SPACECRAFT USING ATTITUDE SENSORS

(75) Inventors: Dan Y. Liu, Rancho Palos Verdes, CA (US); Qinghong W. Wang, Torrance, CA (US); Richard Y. Chiang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 1266 days.

(21) Appl. No.: 12/178,440

(22) Filed: Jul. 23, 2008

(65) Prior Publication Data

US 2010/0019092 A1 Jan. 28, 2010

(51) Int. Cl.
*B64G 1/38* (2006.01)
*B64G 1/28* (2006.01)

(52) U.S. Cl.
USPC .............................. 701/13; 244/165; 244/170

(58) Field of Classification Search
USPC ................ 244/158.1, 164, 165, 158.4, 158.5, 244/158.6, 158.8, 170
See application file for complete search history.

(56) References Cited

U.S. PATENT DOCUMENTS

| | | | | |
|---|---|---|---|---|
| 3,681,583 A | * | 8/1972 | Kubo et al. ..................... | 701/13 |
| 3,767,139 A | | 10/1973 | Fischell | |
| 3,830,447 A | * | 8/1974 | Phillips ......................... | 244/170 |
| 3,940,096 A | * | 2/1976 | Keigler et al. ................. | 244/165 |
| 3,984,071 A | * | 10/1976 | Fleming ......................... | 244/169 |
| 4,306,692 A | * | 12/1981 | Kaplan et al. .................. | 244/165 |
| 4,370,716 A | | 1/1983 | Amieux | |
| 4,386,750 A | * | 6/1983 | Hoffman ....................... | 244/169 |
| 4,424,948 A | * | 1/1984 | Muhlfelder et al. ........... | 244/166 |
| 4,728,062 A | | 3/1988 | Hubert | |
| 4,732,345 A | | 3/1988 | Golden | |
| 4,916,622 A | | 4/1990 | Raman et al. | |
| 5,259,577 A | | 11/1993 | Achkar et al. | |
| 5,269,483 A | | 12/1993 | Flament | |
| 5,597,143 A | * | 1/1997 | Surauer et al. ................. | 244/164 |
| 5,667,171 A | | 9/1997 | Fowell et al. | |
| 5,816,538 A | | 10/1998 | Challoner et al. | |
| 5,884,869 A | | 3/1999 | Fowell et al. | |
| 5,931,421 A | | 8/1999 | Surauer et al. | |
| 5,957,410 A | | 9/1999 | Bruederle et al. | |
| 6,062,512 A | | 5/2000 | Wang et al. | |
| 6,241,194 B1 | | 6/2001 | Heiberg | |
| 6,745,984 B2 | | 6/2004 | Defendini et al. | |

* cited by examiner

*Primary Examiner* — Joseph W Sanderson
(74) *Attorney, Agent, or Firm* — Armstrong Teasdale LLP (57) ABSTRACT

A system for damping nutation and removing wobble of a spacecraft spinning about a given axis is provided. The system includes a sensor configured to determine three dimensional attitude measurements of the spacecraft, a processor operatively coupled to the sensor and configured to execute a process that facilitates aligning the spin axis with a spacecraft momentum vector. The processor, when executing the process, is programmed to receive spacecraft attitude data from the sensor, determine a torque command using the received attitude data, and control a momentum storage actuator on the spacecraft using the determined torque command such that an angular deviation about the given axis is reduced.

17 Claims, 8 Drawing Sheets

SYSTEMS AND METHOD OF CONTROLLING A SPACECRAFT USING ATTITUDE SENSORS

BACKGROUND OF THE DISCLOSURE

The field of the invention relates generally to spacecraft control, and more specifically, to a method and systems for automatically damping nutation and removing wobble from a spinning spacecraft.

The stability of a satellite rotating about a given axis is a concern in many known aerospace applications. For example, some known spacecraft, such as geosynchronous communication satellites, spin about a geometric axis during transfer orbit. More specifically, while in the transfer orbit the spin of a satellite must be stable so that procedures such as attitude determination, thermal control, propellant management, fuel-efficient velocity increment maneuvers, command and telemetry linkage and solar power collection can be accurately performed. A number of disturbance torques, which can be caused by incremental velocity or spin speed change maneuvers, may alter the attitude of the spacecraft. More specifically, these disturbances can induce nutation in the spacecraft. Furthermore, a mass redistribution during the transfer orbit spin can induce wobble in the spacecraft. For example, while in a transfer orbit, when the spin of a satellite is about an intermediate inertia axis, i.e., an axis having a moment of inertia thereabout less than the moment of inertia about a maximum principal axis, and greater than the moment of inertia about a minimum principal axis, the resulting spin is highly unstable. Specifically, a rapidly growing exponential divergence is produced in an uncontrolled intermediate axis spin, as opposed to the slowly-growing divergence which occurs in nutation.

Some known approaches to nutation damping include active nutation damping, wherein two momentum wheels and two gimballed momentum wheel platforms are used in a "vee wheel" configuration. The momentum wheels and platforms are employed to enhance the spin momentum and make the spin axis appear to have the maximum moment of inertia. A problem with these known nutation damping approaches is that they do not account for wobble control. Some other known systems employ an active spin-axis control system to stabilize the intermediate axis spin using thrusters in combination with gyro rate sensing. However, such systems consume irreplaceable propellant when using the thrusters, and further, the orbit and momentum of the satellite are disturbed by use of the thrusters.

In some known spacecraft control systems, a wobble control assembly has been used by open loop dynamic balancing which requires an estimate of the mass properties of the spacecraft, in-flight iteration, and adjustment after major maneuvers. Such spacecraft systems typically require a large number of spin maneuvers to reduce inertia ratios and the geometric wobble angle may substantially change during the transfer orbit. A problem with open loop dynamic balancing is the necessity of iterative ground procedures for controlling the wobble. The success of a mission requires a stabilized spin, effective nutation damping, and wobble control.

BRIEF DESCRIPTION OF THE DISCLOSURE

One aspect is directed to a method of damping nutation and removing wobble of a spacecraft about a given axis. The spacecraft includes with an attitude sensor configured to provide three dimensional spacecraft attitude measurements. The method includes receiving spacecraft attitude data from the attitude sensor, determining a torque command using the received attitude data, and controlling a momentum storage actuator of the spacecraft using the determined torque command such that an angular deviation about the given axis is reduced.

Another aspect is directed to a system for damping nutation and removing wobble of a spacecraft spinning about a given axis. The system includes a sensor configured to determine three dimensional attitude measurements of the spacecraft, a processor operatively coupled to the sensor and configured to execute a process that facilitates aligning the spin axis with a spacecraft momentum vector. The processor, when executing the process, is programmed to receive spacecraft attitude data from the sensor, determine a torque command using the received attitude data, and control a momentum storage actuator on the spacecraft using the determined torque command such that an angular deviation about the given axis is reduced.

Yet another aspect is directed to a spacecraft rotating about a given axis that includes a sensor configured to determine three dimensional attitude measurements of the spacecraft, a momentum storage actuator configured to reduce an angular deviation about the given axis, and a computer readable medium comprising a process to be executed by a processor for use in damping nutation and removing wobble of a spacecraft about the given axis. The processor, when executing said process, is programmed to receive spacecraft attitude data from the sensor, determine a torque command using said received attitude data, and control a momentum storage actuator on the spacecraft using the determined torque command such that an angular deviation about the given axis is reduced.

Various refinements exist of the features noted in relation to the above-mentioned aspects of the present invention. Further features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

DETAILED DESCRIPTION OF THE DISCLOSURE

Figure 1:
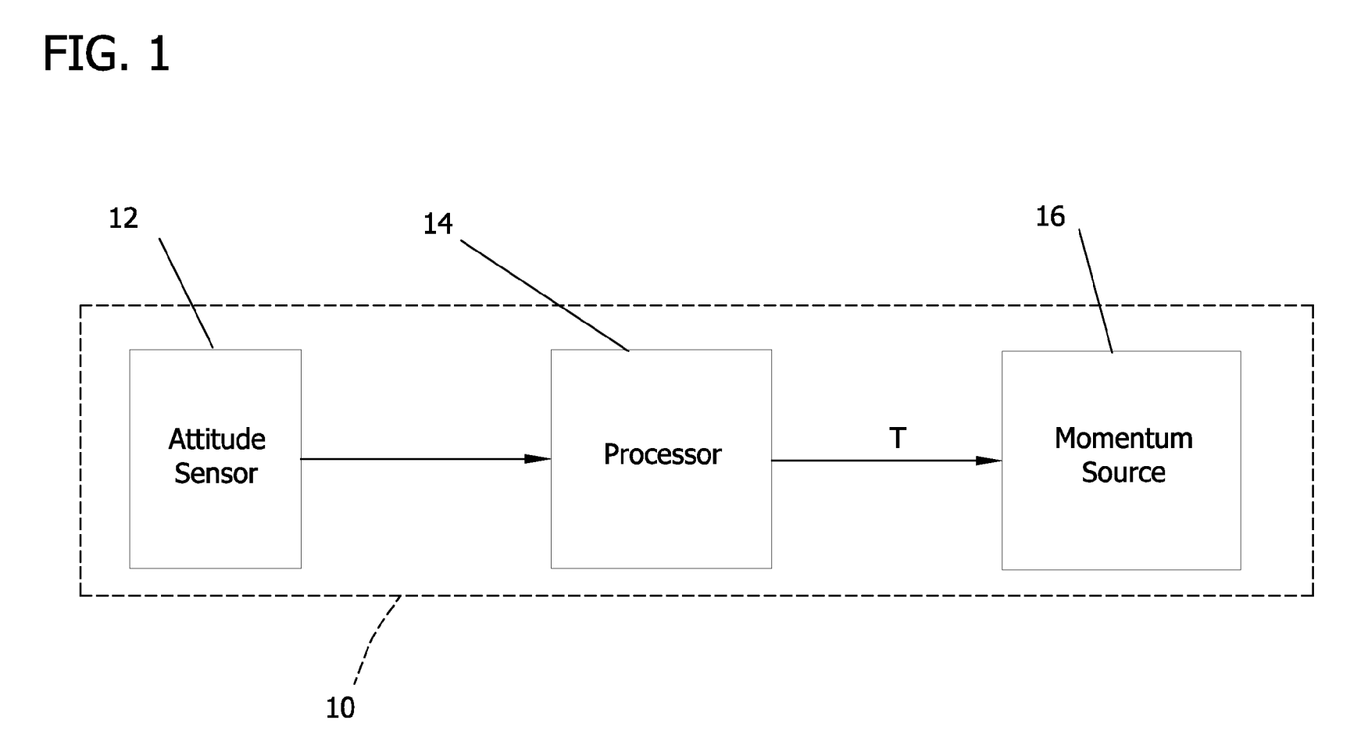
FIG. 1 is a block diagram of an exemplary spacecraft.

FIG. 1 is a block diagram of an exemplary system for automatically damping nutation and substantially reducing a wobble angle from a spacecraft 10. In the exemplary embodiment, spacecraft 10 is a substantially symmetrical body that spins about a spacecraft Z-axis (not shown). Alternatively, spacecraft 10 may be an asymmetrical body spinning about any spacecraft axis. Spacecraft 10 includes at least one attitude sensor 12 in communication with a control processor 14. More specifically, and in the exemplary embodiment, attitude sensor 12 is a star sensor. Alternatively, spacecraft may include a sun sensor, a horizon sensor, a magnetometer, or any attitude sensor or combination thereof that enables spacecraft 10 to function as described herein. Sensor 12 is configured to provide a three dimensional attitude measurement of spacecraft 10 and transmit the measurement to control processor 14. Control processor 14 applies the sensor measurements to form the control signals, as described in more detail herein.

In the exemplary embodiment, spacecraft 10 includes a momentum source 16 configured to generate torque and facilitate dampening nutation and reducing a wobble angle. Control signals are applied to momentum source 16 with a desired torque T represented by the control signals. More specifically, momentum sources are oriented such that each includes a linearly independent spin axes in the transverse plane, or linearly independent momentum components in the transverse plane (i.e., the projection of their spin axes in the transverse plane are linearly independent). The desired torque is determined such that driving momentum sources 16 with the desired torque T simultaneously dampens the nutation and substantially eliminates the wobble of spacecraft, as described in more detail herein. In the exemplary embodiment, momentum source is a plurality of reaction wheels. Alternatively, momentum source 16 may be at least one of a momentum wheel and a control momentum gyro, or any combination thereof that enables spacecraft 10 to function as described herein.

Figure 2:
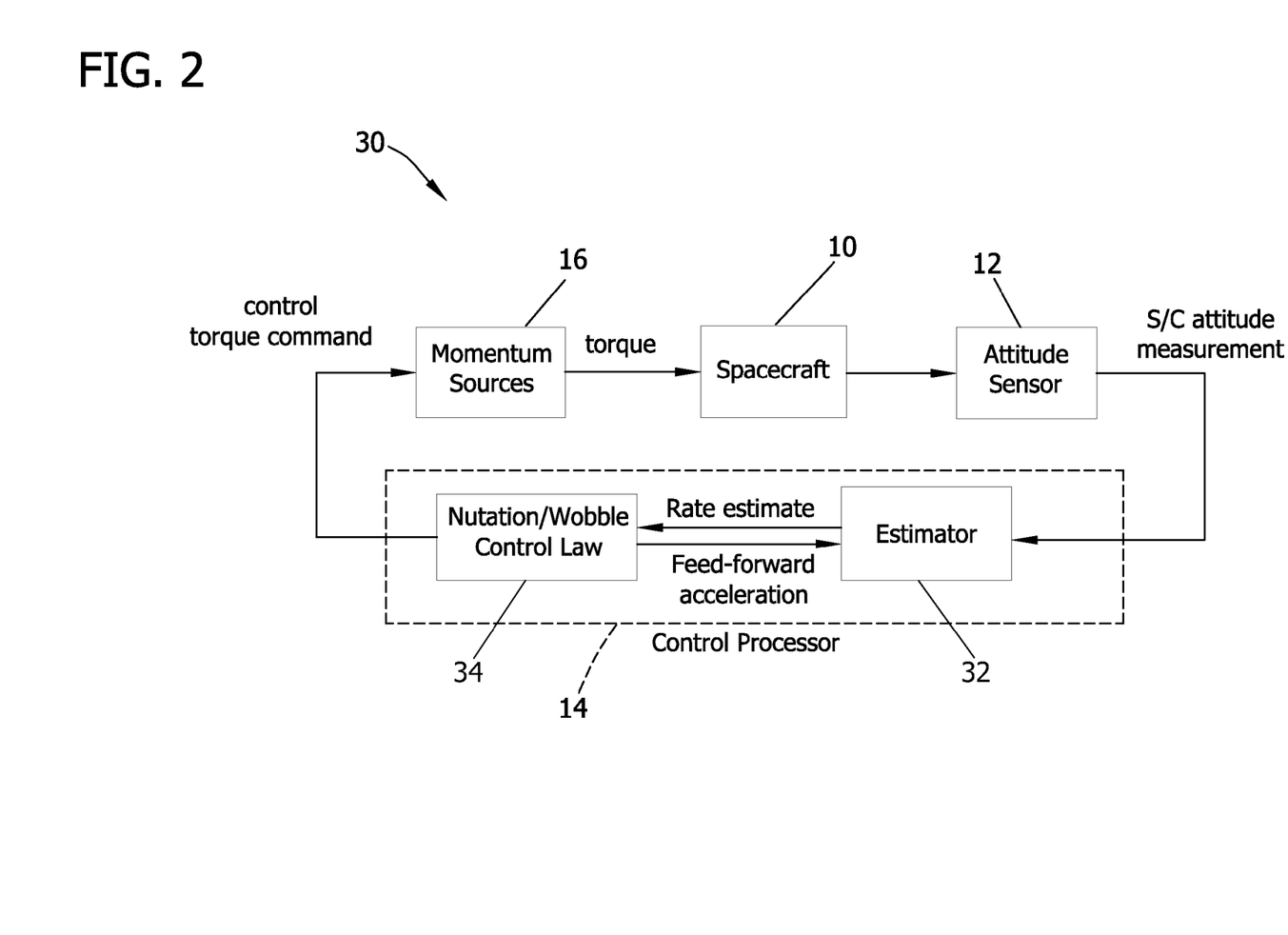
FIG. 2 is a block diagram of an exemplary system for damping nutation and substantially reducing a wobble angle from the spacecraft shown in FIG. 1.

FIG. 2 is a block diagram of a system 30 for automatically damping nutation and substantially reducing a wobble angle from spacecraft 10. System 30 is a closed loop system that includes spacecraft 10, attitude sensor 12, control processor 14, momentum source 16 and respective motors (not shown). As described in detail herein, control processor 14 processes the sensor signals to drive momentum source 16 with derived torques T. Driving momentum sources 16 with the desired torque T damps nutation and removes wobble of spacecraft 10. More specifically, control processor 14 includes an estimator module 32 and a control law module 34. Estimator module 32 computes the angular position and rate of the spacecraft by propagating the equations of motion based on the estimated angular rate or estimated spacecraft inertia matrix about the center of mass, estimated wheel momentum, and computed control accelerations. When attitude measurement data is available, the difference between the measured and estimated attitude is used to update angular position and angular rate estimates. Control law module 34 uses a derived control algorithm as a function of the estimated angular rate to determine the control torque command. It is a stabilizing control algorithm which simultaneously damps the nutation and substantially removes the wobble with internal momentum, as described herein.

The control torque command is determined by the control processor by first determining an angular position and rate estimate of the spacecraft, and then determining a torque command based on the Nutation/Wobble control law. The angular position and rate estimate of the spacecraft is determined by propagating the angular position and rate based on a dynamic and kinematic equations of motion using an estimated angular rate of the spacecraft, an estimated or known inertia matrix of the spacecraft, an estimated or measured momentum of the momentum storage device, and a feed-forward acceleration derived from the control torque command. The angular position and rate estimate is then updated using the difference between the measured and estimated angular position, whenever the attitude data is available.

The control torque command is then determined based on the Nutation/Wobble control law in the form of:

$$T(s)=K(s)\cdot w(s) \quad (1)$$

which was derived as described in commonly owned U.S. Pat. No. 6,062,512, which is herein incorporated by reference. From equation (1) T(s) is the Laplace transform of the torque command, K(s) is the transfer function of the control system; and w(s) is the Laplace transform of the estimated angular rate, and wherein K(s) satisfies the following conditions:

$$K_{dc} = \lim_{s \to 0} K(s) \quad (2)$$

If two-dimensional torque in the transverse plane of the desired the spin axis is available, then $K_{dc}$ is a matrix of rank 2 with null space along the desired spin axis. If one-dimensional torque in the transverse plane of the desired spin axis all that is available, then $K_{dc}$ is a matrix of rank 1.

The following closed-loop system is stable:

wherein G(s) is the transfer function representation of the linearized Euler's equation for a rigid spacecraft, for example:

$$G(s)=C(Is-A)^{-1}B \quad (3)$$

wherein:

$$A = \begin{bmatrix} -I_{cm}^{-1}[\omega_0^\times I_{cm} - (I_{cm}\omega_0 + h_0)^\times] & -I_{cm}^{-1}\omega_0^\times \\ 0_{3\times 3} & 0_{3\times 3} \end{bmatrix} \quad (4)$$

$$B = \begin{bmatrix} -I_{cm}^{-1} \\ 1_{3\times 3} \end{bmatrix} \quad (5)$$

$$C = [\, 1_{3\times 3} \quad 0_{3\times 3} \,] \quad (6)$$

and wherein $I_{cm}$ is the inertia matrix of the spacecraft about a spacecraft center of mass, and $\omega_0$ is the equilibrium spin speed in the desired spin direction, and $h_0$ is the momentum of the actuator that balances the spacecraft about the desired spin, i.e., $$\omega_0 \times (I_{cm}\omega_0 + h_0) = 0 \quad (7)$$

$$v^\times = \begin{bmatrix} 0 & -v_3 & v_2 \\ v_3 & 0 & -v_1 \\ -v_2 & v_1 & 0 \end{bmatrix}$$

represents a skew-symmetric matrix constructed from the vector $$v = \begin{bmatrix} v_1 \\ v_2 \\ v_3 \end{bmatrix}.$$

$1_{i \times j}$ is an identity matrix of dimension i-by-j.
$0_{i \times j}$ is a zero matrix of dimension i-by-j.

Figure 3:
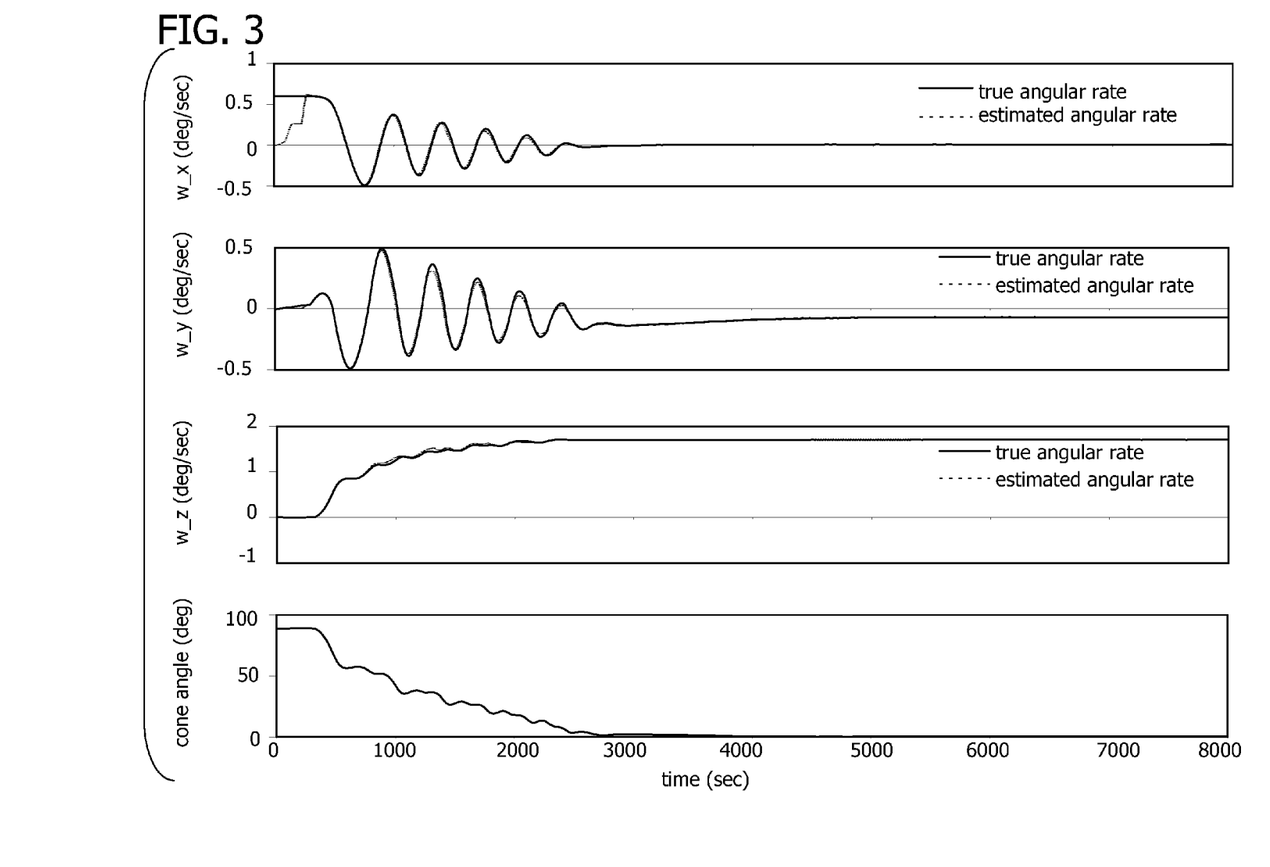
FIGS. 3 and 4 are graphs of testing results for the system shown in FIG. 2 wherein the desired spin axis is parallel to a liquid apogee motor (LAM) force vector.
Figure 4:
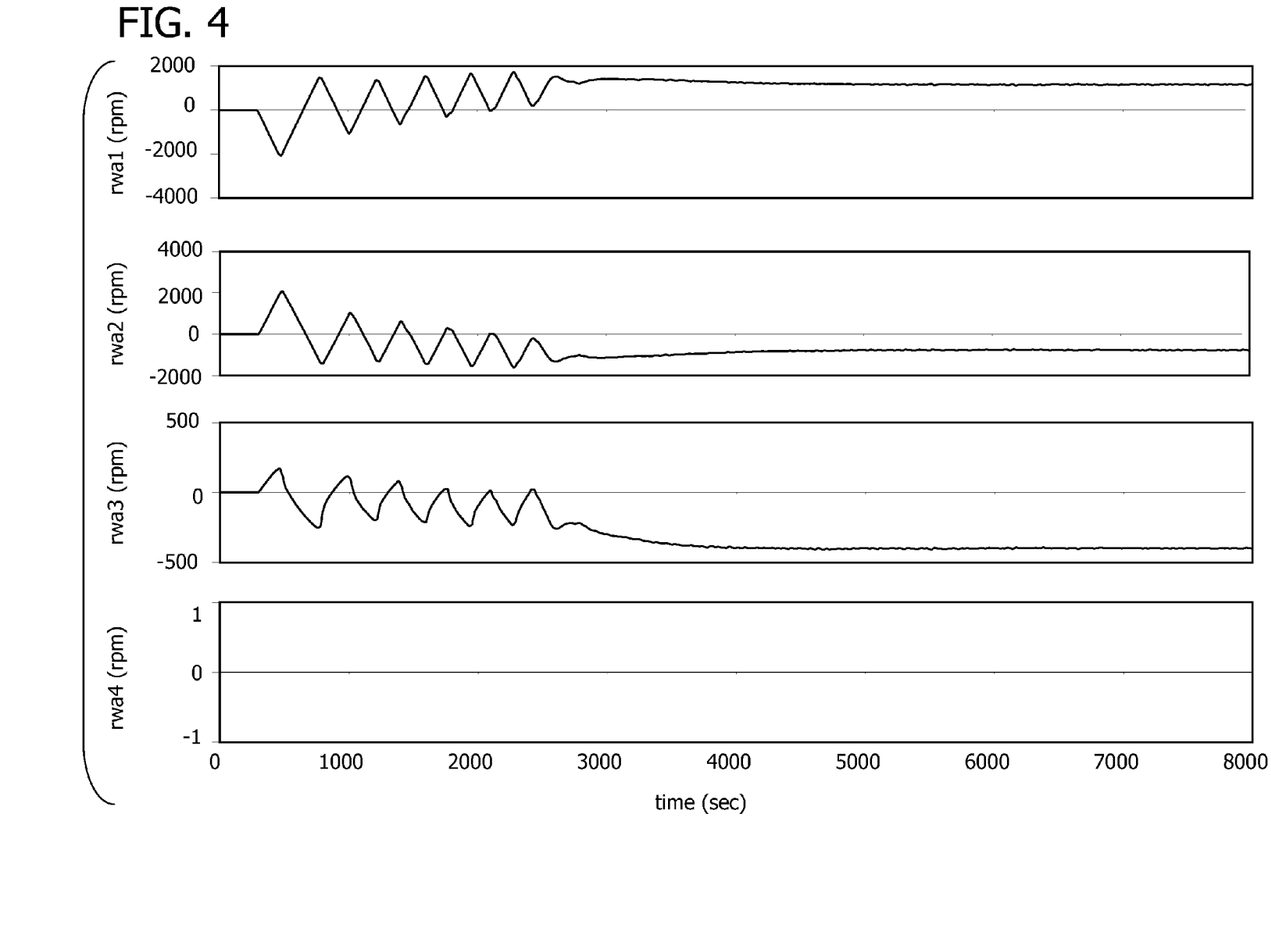

FIGS. 3 and 4 are graphs illustrating simulation results for the system shown in FIG. 2, wherein the desired spin axis is parallel to a liquid apogee motor (LAM) force vector. The control gain K(s) is designed such that the null space of $K_{dc}$ is parallel to the LAM force vector, which is near the minor principal axis of inertia of the spacecraft. A de-damper with diverging time constant of 700 seconds is included in the simulation to replicate the fuel slosh energy dissipation effect. The simulation results are shown in FIGS. 3 and 4. More specifically, FIG. 3 shows that the spacecraft is initially in passive x-spin, wherein the angular rate estimate is (0, 0, 0), the cone angle about the desired spin axis is near 90°. Following attitude estimate convergence, the wheels apply the control torque and maneuver the spacecraft to the desired spin orientation. FIG. 4 illustrates the wheel speeds during a simulation where three wheels are used. At the steady-state, the spacecraft is balanced about the desired spin axis.

Figure 5:
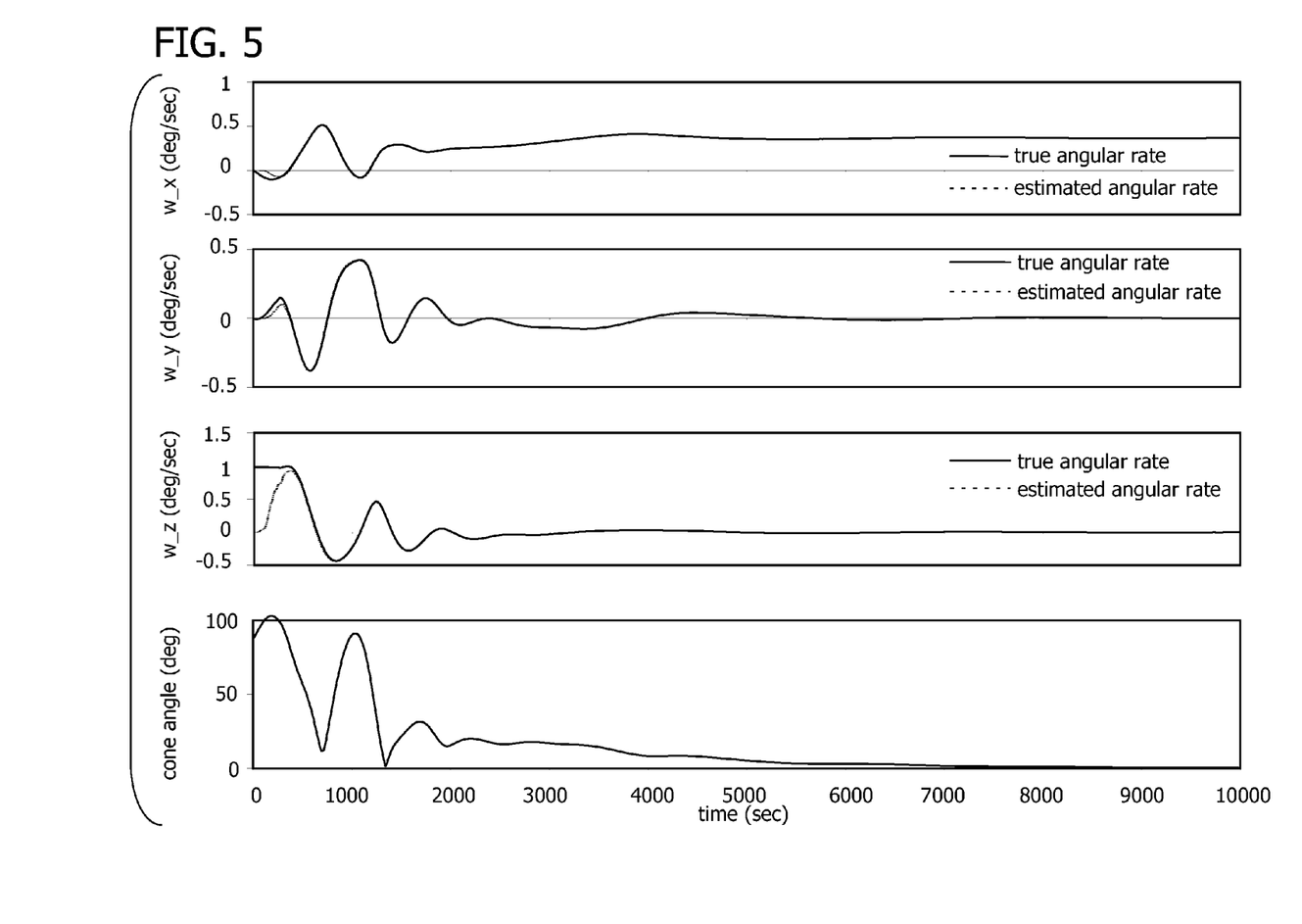
FIGS. 5 and 6 are graphs of testing results for the system shown in FIG. 2 of a Z-axis to X-axis spin simulation.
Figure 6:
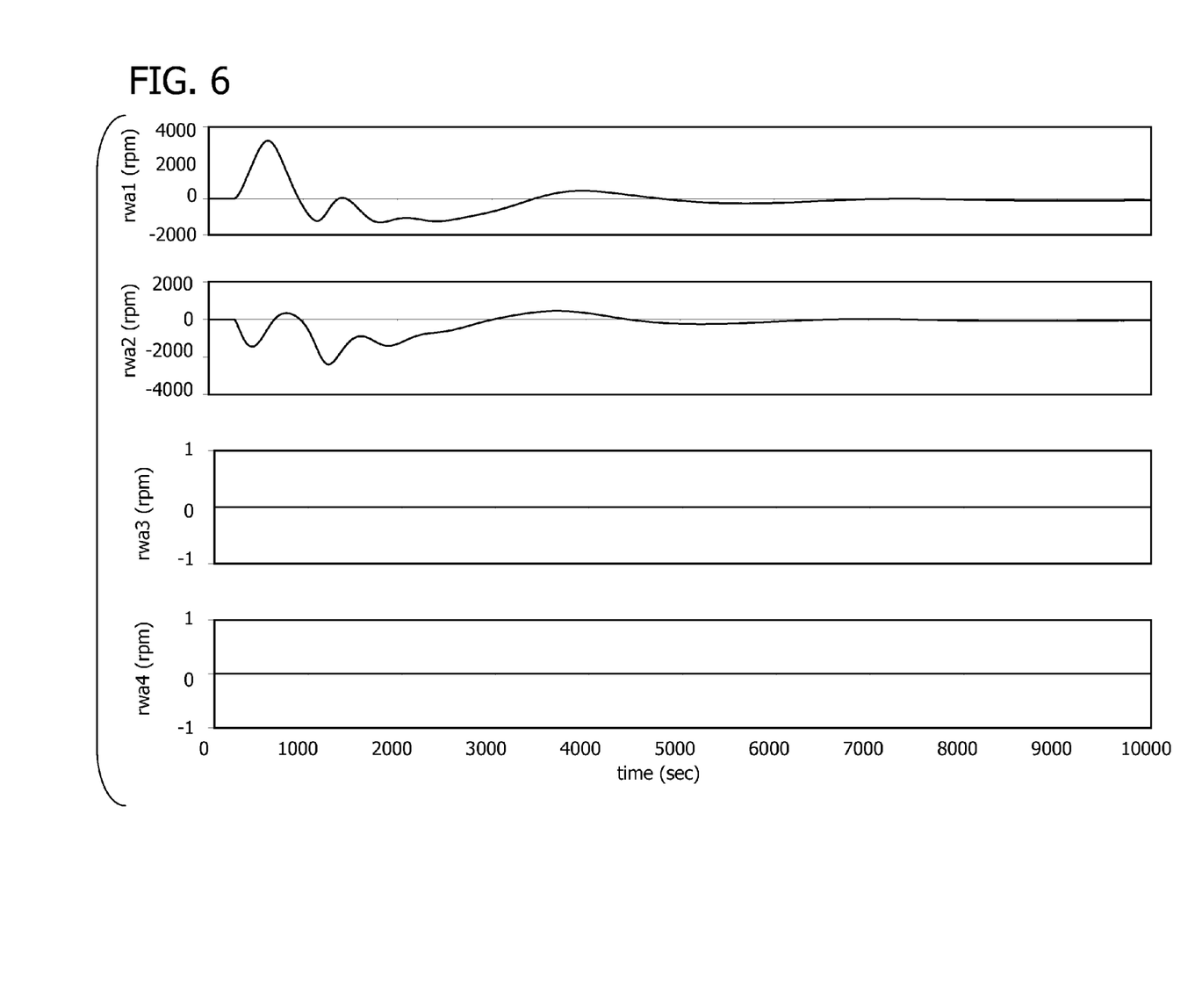

FIGS. 5 and 6 are graphs of testing results for the system shown in FIG. 2 where the spacecraft is maneuvered from a near Z-axis spin to a desired X-axis spin orientation. During this simulation, the desired spin axis is spacecraft X-axis, which is near the major principal axis of inertia. Two reaction wheels are used in this example. FIG. 5 illustrates the spacecraft initially spinning substantially near the Z-axis, wherein the angular rate estimate is (0, 0, 0). The cone angle about the X-axis is approximately 90°. Following the attitude estimate convergence, the wheels apply the control torque to the spacecraft and transition the spacecraft to the desired X-axis spin. FIG. 6 illustrates the respective wheel speeds during the simulation.

Figure 7:
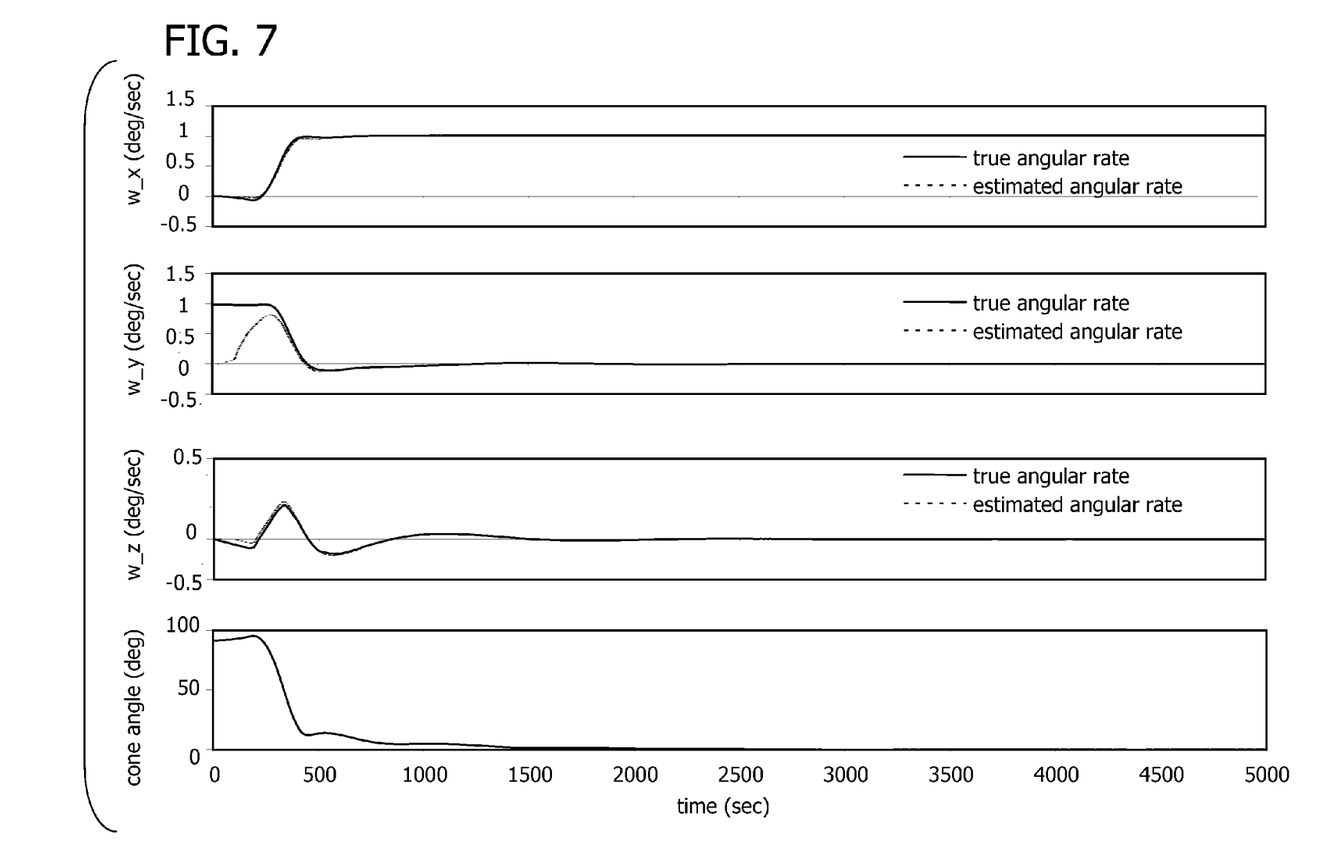
FIGS. 7 and 8 are graphs of testing results for the system shown in FIG. 2 of a simulation of a spin about an intermediate principal axis of inertia.
Figure 8:
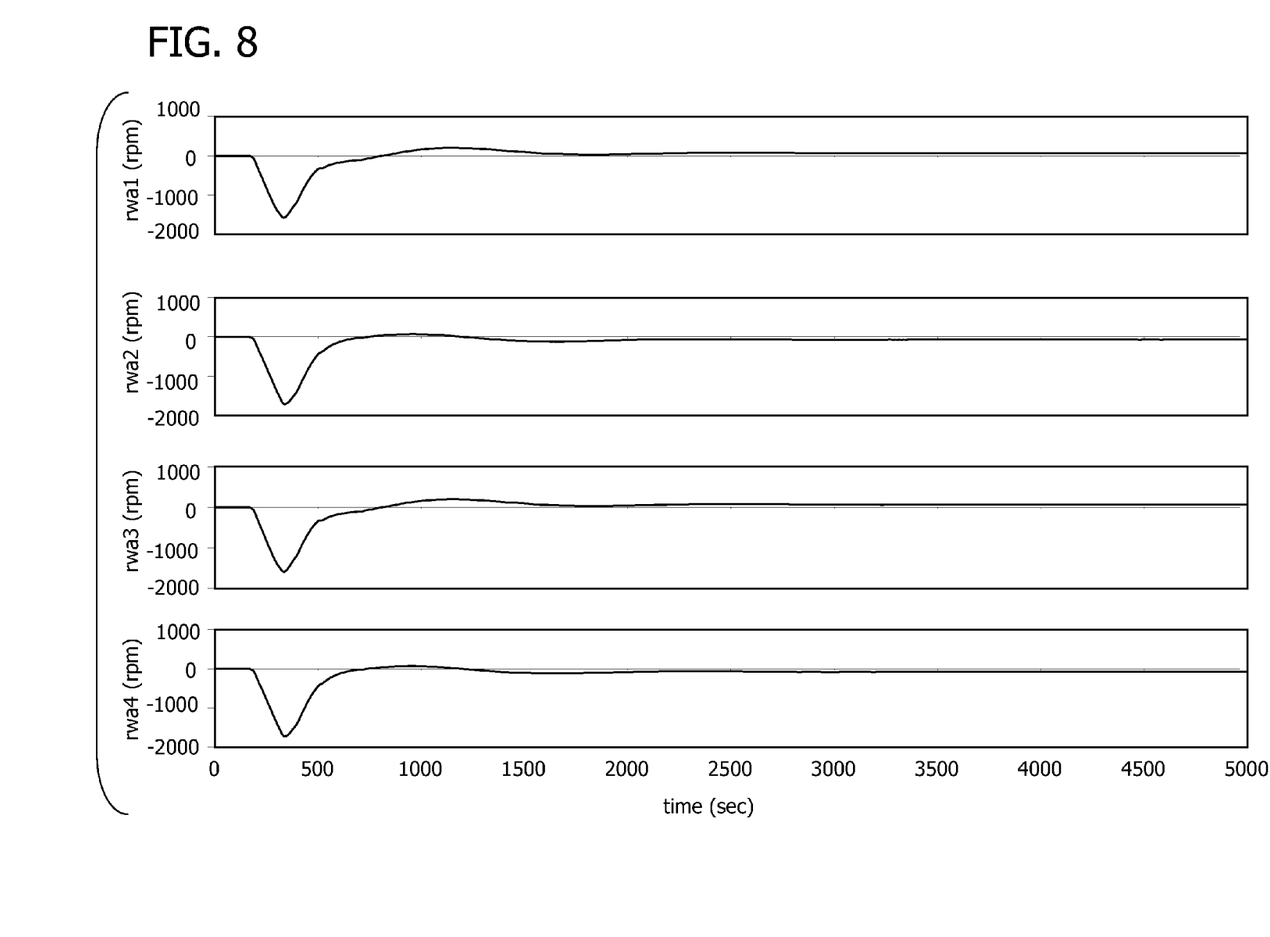

FIGS. 7 and 8 are graphs of testing results for the system shown in FIG. 2 of a simulation of a spin about an intermediate principal axis of inertia. During this simulation, the desired spin axis is the spacecraft X-axis, which is near the intermediate principal axis of inertia. FIG. 7 illustrates the spacecraft initially spinning substantially about the Y-axis, wherein the angular rate estimate is (0, 0, 0) and the cone angle about X-axis is approximately 90°. After the attitude estimate convergence, the wheels apply the control torque to the spacecraft and move the spacecraft to the desired X-axis spin. The cone angle becomes approximately 0° at steady state. FIG. 8 illustrates the wheel speeds during the simulation.

Exemplary embodiments for methods of automatically damping nutation and substantially reducing wobble for use in spacecraft control systems are described in detail above. The above-described methods include sensing the attitude of the spacecraft, and computing torque commands based upon nutation/wobble control laws and attitude measurements facilitate autonomously dampening nutation and substantially reducing wobble in the spacecraft. Moreover, this system is particularly useful for stabilizing a spinning spacecraft without the use of gyros or other rate sensing equipment. The system described herein combines attitude sensor data with a prediction of angular acceleration using an estimation and control laws which account for nutation and wobble, and executes a control torque command for controlling a momentum storage actuator to further stabilize the spacecraft. Using attitude sensor data instead of data from rate sensing equipment provides an added redundancy in spacecraft whose rate sensing devices, i.e. gyros, fail during operation, essentially creating a "gyroless" operation which potentially saves the cost for additional hardware. Moreover, automatic nutation and wobble control using angle-only measurements without the need for rate-sensing gyros, thrusters or mass distribution devices reduces the overall cost of the spacecraft as well. Additionally, automatic control of nutation and wobble angle establishes desired initial conditions for delta-v or other maneuvers and simplifies the on-orbit operations.

Although the foregoing description contains many specifics, these should not be construed as limiting the scope of the present invention, but merely as providing illustrations of some of the presently preferred embodiments. Similarly, other embodiments of the invention may be devised which do not depart from the spirit or scope of the present invention. Features from different embodiments may be employed in combination. The scope of the invention is, therefore, indicated and limited only by the appended claims and their legal equivalents, rather than by the foregoing description. All additions, deletions and modifications to the invention as disclosed herein which fall within the meaning and scope of the claims are to be embraced thereby.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of damping nutation and removing wobble of a spacecraft spinning about a given axis, the spacecraft includes an attitude sensor configured to provide three dimensional spacecraft attitude measurements, wherein the attitude sensor includes at least one of a star tracker, sun sensor, horizon sensor, and magnetometer, said method comprising:
   receiving spacecraft attitude data from the attitude sensor;
   determine an angular position and an angular rate of the spacecraft using the received spacecraft attitude data;
   determining a torque command using the determined angular rate; and
   controlling a momentum storage actuator of the spacecraft using said determined control torque command such that an angular deviation about the given axis is reduced, wherein the angular deviation includes a nutation and a wobble angle.

2. A method in accordance with claim 1 wherein determining an angular position and an angular rate of the spacecraft further comprises estimating the angular position and the angular rate of the spacecraft using at least one of said received attitude data, an estimated inertia matrix of the spacecraft, an estimated wheel momentum of the spacecraft, and a feedforward acceleration using said determined control torque command.

3. A method in accordance with claim 2 wherein determining a torque command further comprises dampening the nutation of the spacecraft and reducing the wobble angle of the spacecraft with internal momentum.

4. A method in accordance with claim 1 wherein controlling a momentum storage actuator of the spacecraft further comprises executing a control command by at least one of a momentum wheel, a reaction wheel, and a control momentum gyro.

5. A method in accordance with claim 4 further comprising providing a one-dimensional torque to facilitate controlling a wobble angle about a single spacecraft axis.

6. A method in accordance with claim 4 further comprising providing a two-dimensional torque to facilitate controlling a wobble angle to zeros.

7. A system for damping nutation and removing wobble of a spacecraft spinning about a given axis, said system comprising:
- a sensor configured to determine three dimensional attitude measurements of said spacecraft, wherein said sensor comprises at least one of a star tracker, sun sensor, horizon sensor, and magnetometer;
- a processor operatively coupled to said sensor and configured to execute a process that facilitates aligning said spin axis with a spacecraft momentum vector, said processor, when executing said process, is programmed to:
- receive spacecraft attitude data from said sensor;
- determine an angular position and an angular rate of the spacecraft using the received spacecraft attitude data;
- determine a torque command using the determined angular rate; and
- control a momentum storage actuator of said spacecraft using said determined torque command such that an angular deviation about the given axis is reduced, wherein the angular deviation includes a nutation and a wobble angle.

8. A system in accordance with claim 7 wherein the momentum storage actuator is configured to reduce the angular deviation about the given axis.

9. A system in accordance with claim 8, wherein the processor further comprises
- a control law module programmed to provide the torque command to said actuator.

10. A system in accordance with claim 7 wherein
the processor, when executing said process, is further programmed to estimate the angular position and the angular rate of the spacecraft using at least one of said received attitude data, an estimated inertia matrix of the spacecraft, an estimated wheel momentum of the spacecraft, and a feedforward acceleration using said determined control torque command.

11. A system in accordance with claim 10 wherein the processor, when executing said process, is further programmed to determine the nutation of the spacecraft and reducing the wobble angle of the spacecraft with internal momentum.

12. A system in accordance with claim 7 wherein the processor, when executing said process, is further programmed to execute a control command by at least one of a momentum wheel, a reaction wheel, and a control momentum gyro.

13. A spacecraft spinning about a given axis comprising:
- a sensor configured to determine three dimensional attitude measurements of said spacecraft, wherein said sensor comprises at least one of a star tracker, sun sensor, horizon sensor, and magnetometer;
- a momentum storage actuator configured to reduce an angular deviation about the given axis; and
- a non-transitory computer readable medium comprising a process to be executed by a processor for use in damping nutation and removing wobble of a spacecraft about the given axis, said processor, when executing said process, is programmed to:
- receive spacecraft attitude data from said sensor;
- determine an angular position and an angular rate of the spacecraft using the received spacecraft attitude data;
- determine a torque command using the determined angular rate; and
- control the momentum storage actuator of said spacecraft using said determined torque command such that an angular deviation about the given axis is reduced, wherein the angular deviation includes a nutation and a wobble angle.

14. A spacecraft in accordance with claim 13 wherein the momentum storage actuator is configured to reduce the angular deviation about the given axis.

15. A spacecraft in accordance with claim 14, wherein the processor further comprises
- a control law module programmed to provide the torque command to said actuator.

16. A spacecraft in accordance with claim 13 wherein
the processor, when executing said process, is further programmed to estimate the angular position and the angular rate of the spacecraft using at least one of said received attitude data, an estimated inertia matrix of the spacecraft, an estimated wheel momentum of the spacecraft, and a feedforward acceleration using said determined control torque command.

17. A spacecraft in accordance with claim 13 wherein the processor, when executing said process, is further programmed to execute a control command by at least one of a momentum wheel, a reaction wheel, and a control momentum gyro.

* * * * *